(12) United States Patent
Giencke

(10) Patent No.: US 11,275,039 B2
(45) Date of Patent: Mar. 15, 2022

(54) DIVERGENT BEAM TWO DIMENSIONAL DIFFRACTION

(71) Applicant: Bruker AXS, Inc., Madison, WI (US)

(72) Inventor: Jonathan Giencke, Verona, WI (US)

(*) Notice: Subject to any disclaimer, the term of this patent is extended or adjusted under 35 U.S.C. 154(b) by 138 days.

(21) Appl. No.: 16/044,940

(22) Filed: Jul. 25, 2018

(65) Prior Publication Data

US 2020/0033275 A1 Jan. 30, 2020

(51) Int. Cl.
*G01N 23/00* (2006.01)
*G01N 23/207* (2018.01)
*G01N 23/20016* (2018.01)

(52) U.S. Cl.
CPC ... *G01N 23/2076* (2013.01); *G01N 23/20016* (2013.01)

(58) Field of Classification Search
CPC .................. G01N 23/207; G01N 23/20016
See application file for complete search history.

(56) References Cited

U.S. PATENT DOCUMENTS

| 2006/0093090 A1* | 5/2006 | He | G01N 23/207 378/70 |
| 2011/0268251 A1* | 11/2011 | He | G01N 23/207 378/71 |

FOREIGN PATENT DOCUMENTS

EP 2818851 A1 12/2014

* cited by examiner

*Primary Examiner* — Dani Fox
(74) *Attorney, Agent, or Firm* — Benoit & Côté Inc.

(57) ABSTRACT

A two-dimensional X-ray diffractometer uses an X-ray source that emits a divergent beam toward a sample under test. The divergent beam has a substantially fixed width in a first direction perpendicular to its propagation direction, and a thickness in a second direction perpendicular to the propagation direction that increases proportionally to a distance from the source. An aperture may be used to block a portion of the beam in the second direction, and the sample is positioned so that the beam illuminates a two-dimensional area of the sample surface. The detector detects an X-ray signal diffracted from the sample across a two-dimensional detection area, and may use a one-dimensional detector array that collects diffracted X-ray signal at a number of different positions. The source, detector and sample may be mounted to a goniometer to maintain them in a desired relative orientation.

18 Claims, 4 Drawing Sheets

DIVERGENT BEAM TWO DIMENSIONAL DIFFRACTION

BACKGROUND OF THE INVENTION

Field of the Invention

This invention relates generally to the field of X-ray diffraction analysis and, more specifically, to an improved method of X-ray diffraction analysis of powder samples.

Description of the Related Art

Two-dimensional x-ray diffraction refers to x-ray diffraction applications with a two-dimensional diffraction image and corresponding data reduction and analysis. A two-dimensional diffraction pattern contains far more information than a one-dimensional profile collected with a conventional diffractometer. In recent years, usage of two-dimensional (2D) detectors has dramatically increased due to advances in detector technology, point beam x-ray optics, and computing power. A two-dimensional diffractometer is a diffraction system with the capability of acquiring a diffraction pattern in two-dimensional space and analyzing 2D diffraction data accordingly.

A two-dimensional diffractometer system typically uses an X-ray generator that produces an X-ray beam with the required radiation energy and X-ray optics to condition the primary X-ray beam to the required wavelength, beam focus size, beam profile and divergence. A sample for analysis is held in a goniometer used to maneuver the geometric relationship between the X-ray beam, the sample and a detector for detecting the diffracted X-ray signal. The detector records the diffracted X-rays over a two-dimensional area, and may be a two-dimensional area detector or a one-dimensional line detector that is scanned through the detection area. A detection signal from the detector is transferred to a processing unit, which stores and typically displays the diffraction pattern in a two-dimensional image frame.

In an X-ray powder diffraction experiment, the relative intensity of the peaks in a diffractogram are used to determine the fundamental atomic structure of the material. Analyses such as fingerprint style phase identification or fitting routines for phase quantification assume a randomly oriented microstructure with crystallite size much smaller than the beam footprint. However, in practice this is often not the case. Crystallite sizes on the order of 10-100 microns and preferred orientation of the crystallites can occur due to formation conditions of the pristine sample or due to externally applied conditions during sample preparation, causing deviations of the peak intensities ranging from complete elimination to exaggeration by several orders of magnitude. These deviations result in incorrect identification and quantification of the phases that are present.

Because of the potential for this type of distortion, two-dimensional diffraction is often used to determine if morphological effects are influencing the relative intensities in an X-ray diffractogram. By visualizing diffracted beam intensity as a function of tilt relative to the surface normal, the effect of large grains and preferred orientation can be identified. A perfectly random orientation with small grains will yield consistent intensity as a function of tilt. Large grains will result in a random pattern of accentuated and absent intensity while preferred orientation will result in streaks of intensity accentuation accompanied with areas of reduced intensity. If the overall intensity at a given peak location is integrated over a wide range of tilts, the intensity will converge on the expected intensity values.

Known variations of two-dimensional diffraction include the "side tilt" method (also referred to as the "gamma" method), which utilizes a spot beam footprint on the sample and diffracted intensity collection perpendicular to the goniometer plane. An example of this method is shown schematically in FIG. 1A, which depicts an X-ray source 110 which, in conjunction with conditioning optics 112, emits an X-ray beam 114 toward a sample 116 under examination. The conditioning optics in this type of system typically include a very expensive X-ray mirror 112a, as well as a set of pinhole apertures 112b. The X-ray signal diffracted from the sample 116 is detected by detector 118, which produces an output signal indicative thereof. The X-ray source 110, sample 116 and detector 118 are all mounted to a goniometer 120, which maintains them in a relative geometric relationship appropriate to the measurement.

In the side-tilt method, the incident X-ray beam 114 is a small spot parallel beam, and the intensity of the diffracted X-ray signal is detected by detector 118, which outputs a signal used to generate a two-dimensional plot. The detector 118 may be a two-dimensional array of sensors or a single row of sensors arranged perpendicular to the goniometer plane that is scanned along the goniometer circle direction. In this method, the collected image is warped due to non-linear sampling of the reciprocal lattice. In addition, generation of the necessary parallel spot is complex and expensive, relative to a simple line slit geometry, and produces a less intense signal. Moreover, the relatively small area of the specimen 116 being examined can bias the result by accentuating localized grain size and preferred orientation effects as well as being susceptible to non-homogeneous distributed phases.

FIG. 1B depicts both the geometry of the diffraction experiment of FIG. 1A, and a typical plot of the detector output, in which the horizontal axis represents 2θ, corresponding to the diffraction angle between the incident X-ray beam 114 and the diffracted X-ray signal detected by detector 118. The vertical axis in this detector output plot represents gamma (γ), which corresponds to the tile angle of crystallites in the sample contributing to the diffraction rings. The position of the rings in 2θ are indicative of the distance between the atoms in sample 116 while the morphology of the ring in gamma is directly correlated to the morphology of the sample. In this case the smooth uniform rings indicate a randomly oriented fine crystallite structure.

Another known two-dimensional diffraction method is the "parallel beam method" (also referred to as the "iso-inclination tilt method"), which utilizes a line beam footprint on the sample and diffracted intensity collection in the goniometer plane. This method overcomes some of the issues related to the side-tilt method, but in order to achieve sufficient resolution, the diffracted beam must be reduced to a narrow dimension in the goniometric scan direction. This may be done either by physically reducing the primary beam size or by using an asymmetric measurement condition in which the primary beam is at an extremely high angle (referred to as a "positive asymmetric geometry") and the diffracted beam is collected at an extremely low angle relative to the sample surface, resulting in compression of the diffracted beam.

An example of the parallel beam method is shown schematically in FIG. 2A. An X-ray source 210, together with conditioning optics 212 which, as in the side-tilt method of FIGS. 1A and 1B, requires a very expensive X-ray mirror. An incident X-ray beam 214 generated by source 210 and conditioned by X-ray mirror 212a has a flat, ribbon-shaped profile that results in illumination of a linear region of sample 216. The X-ray signal diffracted from the sample 216 is collected by detector 218, which generates an output used to create a two-dimensional plot. As in FIG. 1A, the components shown in FIG. 2A are mounted to a goniometer 220 to maintain them in an appropriate geometrical relationship and facilitate motion to build a two-dimensional data array.

FIG. 2B depicts both the geometry of the FIG. 2A arrangement, showing incident angle $\theta_1$ of X-ray beam 214 and diffraction angle $\theta_2$, as well as an example plot of the detector output. A variety of diffracted beam directions is recorded with the detector 218, which typically uses a one-dimensional array at each of a number of different goniometer positions. The output plot shown in FIG. 2B has $2\theta$ as its horizontal axis, while the vertical axis is $\theta_1$, corresponding to the angular position of the source relative to the sample surface. The position of the lines in $2\theta$ are indicative of the distance between the atoms in sample 216 while the morphology of the line in $\theta_1$ is directly correlated to the morphology of the sample. In this case, the smooth uniform lines indicate a randomly oriented fine crystallite structure. The data is collected in the goniometer plane, corresponding to a linear cross section of reciprocal space with no warping effects, and the line beam footprint on the sample results in increased sampling statistics. However, the need for a parallel beam with narrow aspect ratio or heavily asymmetric measurement geometry results in a weaker signal and reduced sample coverage relative to the simple linear slit geometry.

Using either the side-tilt or the parallel beam method, the morphological effects such as crystallite size and preferred orientation can be observed. However, both methods require specialized beam conditioning to ensure sufficient resolution, the former requiring the beam to be a small parallel spot while the latter requires the beam to be either a narrow parallel line or a broad parallel line with data collected in a positive asymmetric measurement geometry. This results in a relatively high overall tool cost, an increase in beam path complexity, a reduction in integrated flux on the sample surface and a reduction in specimen sampling.

SUMMARY OF THE INVENTION

The present invention is directed to an improved X-ray diffractometer for the collection of two-dimensional X-ray data from a sample. The diffractometer uses an X-ray source that emits a divergent X-ray beam toward the sample, the source being positioned relative to the sample so that the beam illuminates a two-dimensional area of a surface of the sample. The divergent nature of the beam is such that the beam has a substantially fixed width in a first direction and a thickness in a second direction perpendicular to the first direction that increases proportionally to a distance from the source. In an exemplary embodiment, the X-ray source includes an aperture through which the beam passes, and the aperture may block a portion of the beam in the second, diverging direction.

The X-ray signal diffracted from the sample is collected by the detector across a one-dimensional detection area. A positioning mechanism is used to reposition at least one of the source and detector so as to allow for collection of the diffracted X-ray signal by the detector at a plurality of relative angular positions of the source, detector and sample. The detected X-ray signal is used to form a multi-dimensional dataset indicative of X-ray intensities in the one-dimensional detection area for each of the relative angular positions. The X-ray detector may be a one-dimensional detector array, and the X-ray source, detector and sample may be mounted in a predetermined relative orientation in a goniometer, which is adjustable to change the relative positions of the X-ray source, detector and sample. In the exemplary embodiment, the X-ray source and detector each have a distance to the sample that is substantially equal, and the diffracted X-ray signal from the sample is focused to a substantially linear profile at the detector.

In a particular embodiment of the invention, the sample is a powder sample, and the diffracted X-ray signal is indicative of certain morphological effects of crystallites of the sample material. Such morphological effects may include the size of the crystallites and any preferred orientation that they may assume. In a particular embodiment, the diffractometer includes a positioning mechanism that repositions at least one of the source and detector along a circular path, and the one-dimensional detection area is parallel to a tangent of the circular path. The assembled multi-dimensional dataset is indicative of morphological characteristics of the sample that may affect the quality of the X-ray diffraction data. In a method according to the invention, this information may be used to indicate the quality of qualitative and quantitative analyses performed on the resulting data including, but not limited to, phase identification and phase quantification, and may serve to indicate a degree of confidence in subsequent analyses or to provide assistance in performing subsequent analysis.

DETAILED DESCRIPTION

Figure 1A:
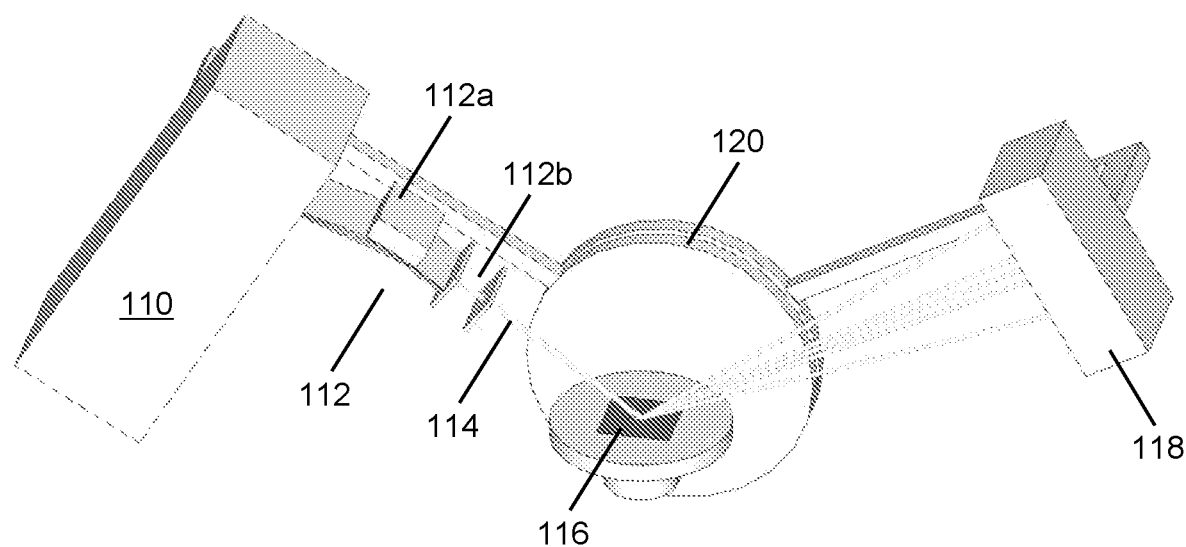
FIG. 1A is a schematic perspective view of a two-dimensional X-ray diffraction system according to the prior art based on a "side-tilt" configuration.
Figure 2A:
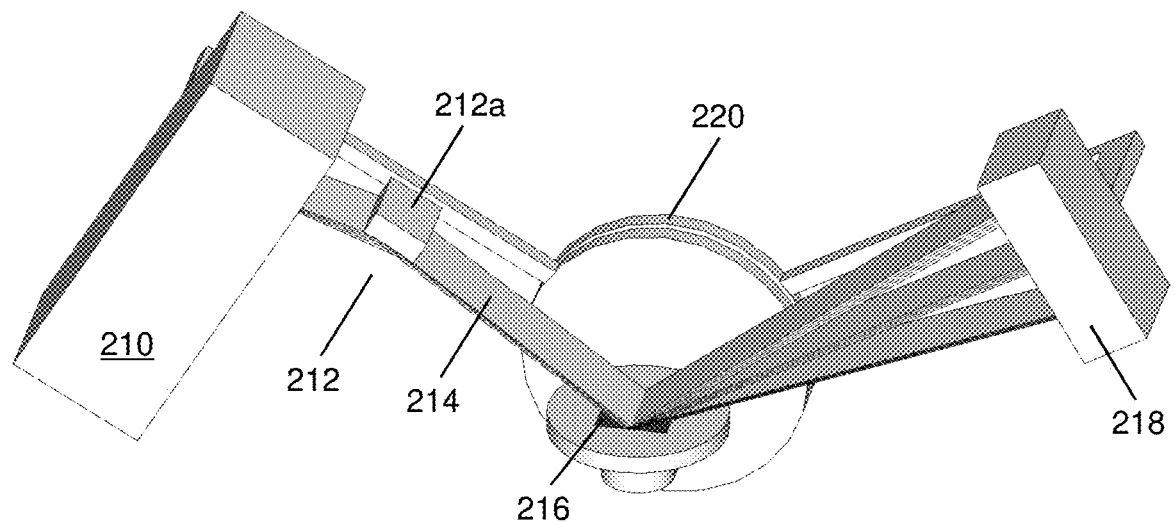
FIG. 2A is a schematic perspective view of a two-dimensional X-ray diffraction system according to the prior art based on a "parallel beam" configuration.
Figure 3A:
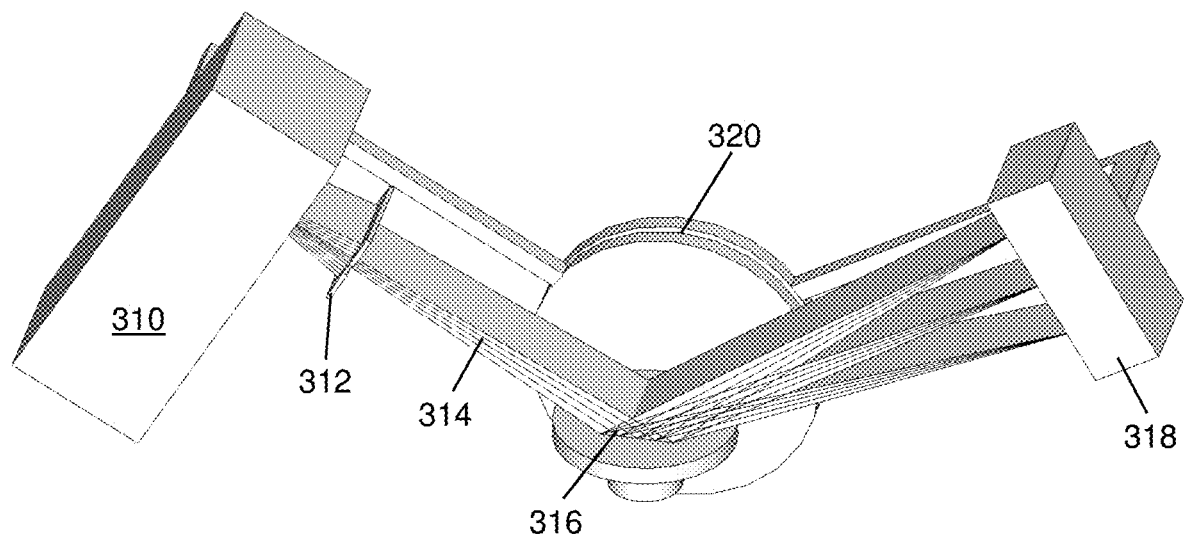
FIG. 3A is a schematic perspective view of a two-dimensional X-ray diffraction system according to the present invention.

FIG. 3A is a schematic representation of a two-dimensional X-ray diffraction method that uses an X-ray beam source 310 that produces a divergent X-ray source beam 314 that is incident on a sample material 316. The beam from source 310 first passes though an aperture 312 that limits the size of the beam. The aperture 312 may be of different configurations and, in an exemplary embodiment, uses one or more metallic surfaces that form a slit in a direction perpendicular to the beam direction so as to limit the size of the beam in the direction of divergence. The aperture 312 is precisely positioned relative to the source 310, and is moved with the source when the source is repositioned. This replaces the conditioning optics used in prior art systems, such as the optics 212 used with the parallel beam method of FIG. 2A, which typically include a very expensive X-ray mirror 212a, or the optics 112 of the side tilt method of FIG. 1A, which require a similar mirror 112a as well as a set of pinhole apertures 112b.

In the present embodiment, the aperture 312 is adjustable to allow the opening to be narrowed or widened in the direction of the beam divergence. This permits the beam 314 to be adjusted so that its footprint at the sample location can be matched to the size of the sample 316. It may also be made adjustable in the elongate direction of the aperture if desired, to allow for a similar change in a perpendicular direction of the beam footprint. This adjustability may also be controlled by a control system that detects the beam footprint and adjusts the aperture to match it to the sample profile.

In operation, the beam 314 has an essentially fixed width in a first direction perpendicular to the beam propagation direction, and is divergent in the other direction perpendicular to the beam propagation direction. The divergence of the beam 314 results in a large area of illumination on the sample surface. Due to the parafocusing nature of reflection geometry X-ray powder diffraction, the diffracted X-ray beam converges at a sample-to-detector distance equal to that of the X-ray source-to-sample distance. Thus, with the X-ray source 310, the sample 316 and the detector 318 held by goniometer 320 so that the sample is equidistant from the source and detector, the diffracted X-ray signal is focused to a linear profile at the detector location, as shown in FIG. 3A. This geometry eliminates the need for the generation of a narrow parallel beam or parallel beam combined with positive asymmetric measurement geometry.

In the embodiment associated with FIG. 3A, the detector 318 employs a one-dimensional array, which is used to record a variety of diffracted beam directions. These different beam directions may result from a range of different atomic distances within the sample. Following a collection of data in one position, the goniometer is adjusted and the one-dimensional array collects data from another position. This relative motion can be accomplished by moving the X-ray source 310 and aperture 312, which have a fixed position relative to each other, by moving the detector 318, or through a combined motion of the source/aperture and detector. After data is collected at a full range of positions, the intensities are recorded in a two-dimensional plot, with the x-axis typically representing the angle in the goniometric plane between the incident beam 314 and the diffracted signal, and the y-axis being the "tilt" direction of crystallites along the goniometer movement plane. This allows for a clear indication of the presence of large crystallites or the existence of a preferred orientation among crystallites, which can contribute to incorrect identification and quantification of the phases that are present.

Figure 1B:
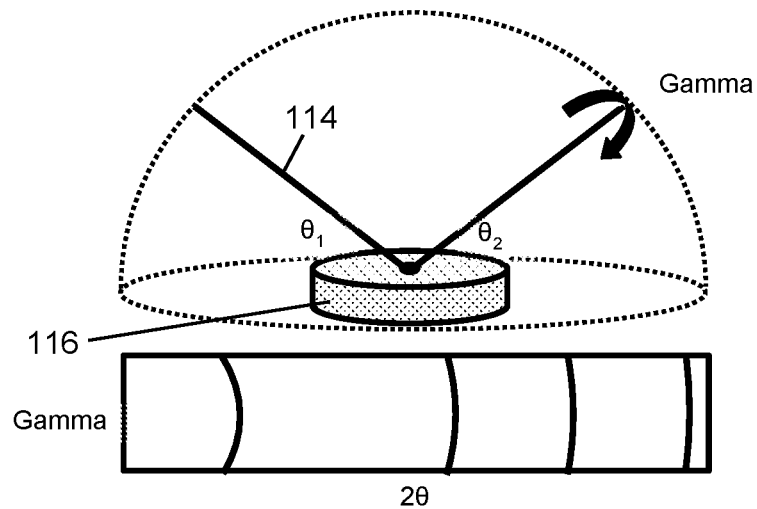
FIG. 1B is a schematic view of the geometrical configuration of the system of FIG. 1A and an example diffractogram produced therefrom.
Figure 2B:
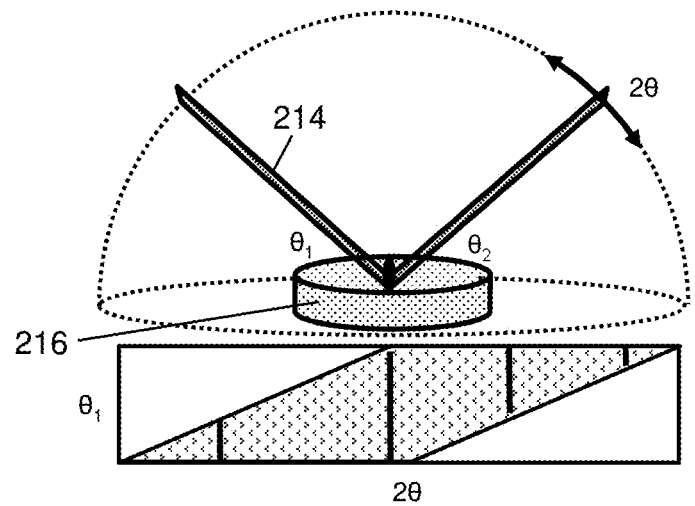
FIG. 2B is a schematic view of the geometrical configuration of the system of FIG. 2A and an example diffractogram produced therefrom.
Figure 3B:
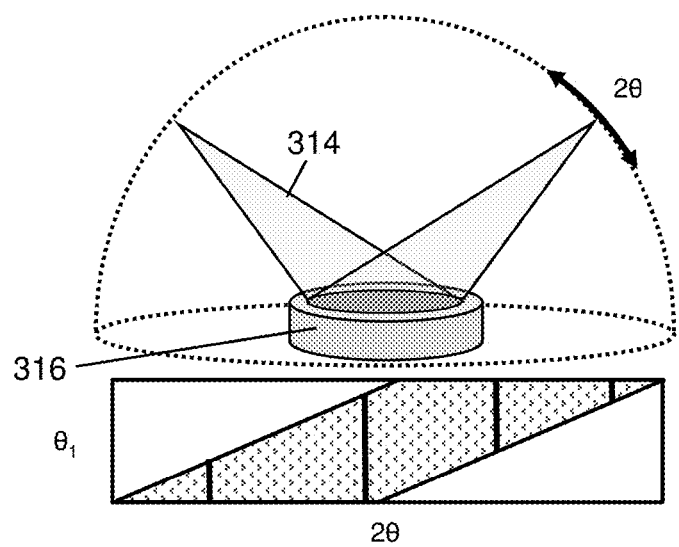
FIG. 3B is a schematic view of the geometrical configuration of the system of FIG. 3A and an example diffractogram produced therefrom.

A depiction of the geometry of the FIG. 3A embodiment, along with an example plot of the detected X-ray intensities, is shown schematically in FIG. 3B. As in the detector outputs of prior art methods depicted in FIGS. 1B and 2B, the two-dimensional output plot shown in FIG. 3B has a horizontal axis $2\theta$ that is indicative of the distance between the atoms in sample 316. The vertical axis is $\theta_1$, corresponding to the angular position of the source relative to the sample surface. As in the parallel beam method of FIG. 2B, the smooth uniform lines indicate a randomly oriented fine crystallite structure. However, unlike the prior art, the system of FIGS. 3A and 3B uses a much simpler beam conditioning arrangement and provides a large beam footprint that can cover the entire sample surface.

As discussed above, two-dimensional diffraction is often used to identify morphological effects resulting from powder samples having oversized crystallites or crystallites with a preferred orientation. Both the side-tilt and parallel beam methods may be used in this capacity, but both require specialized beam conditioning to ensure sufficient resolution. In particular, the former requires the source beam to be a small parallel spot, while the latter requires the beam to be either a narrow parallel line or a broad parallel line with data collected in a positive asymmetric measurement geometry. Both of these prior art methods require substantial reduction in the area of the specimen being sampled leading to localization of the resulting analysis. The divergent beam method of the present invention, however, allows this data to be collected while maintaining the same large footprint beam geometry used for conventional one-dimensional scanning and without the need for additional beam conditioning optics.

In the present invention, data may be collected using a one-dimensional array, but data collection at a number of different relative positions of the source, detector and sample allow for assembly of a multi-dimensional dataset that provides morphological information regarding the sample. In conventional one-dimensional data gathering, a one-dimensional detector collects data for a series of different angles along the $\theta_2$ range covered by the detector. As the goniometer changes $2\theta$, the $\theta_2$ range covered by the detector changes, but it still includes some of the same angles, which are again measured using different pixels of the detector. These new measurements are summed with the earlier measurements corresponding to the same angles into a one-dimensional dataset, and are divided by the number of measurements to give an average measurement value for each angle. In this way, a series of intensity values is obtained along the entire $\theta_2$ range spanned by all positions of the 1D detector.

In the present invention, data is collected along a similar range, but the data collected for a given angle is not summed for different detection positions into a one-dimensional dataset. Rather, the data collected at each position is kept separated and assembled into a two-dimensional dataset that provides morphological information about the sample. In particular, changes in the data collected for a particular angle when $2\theta$ is changed can be indicative of instrument tolerances, but can also indicate characteristics of a powder sample that limit its measurability. Identification of such morphological characteristics permits a user to recognize when a sample may be improperly prepared and may therefore provide substandard measurement data.

Figure 4A:
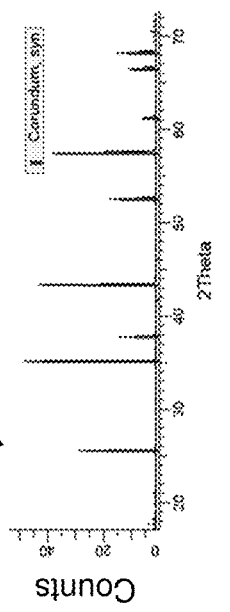
FIG. 4A shows a two-dimensional diffractogram and corresponding X-ray diffraction spectrum for a powder sample consisting of relatively small crystallites with random orientation.
Figure 4A:
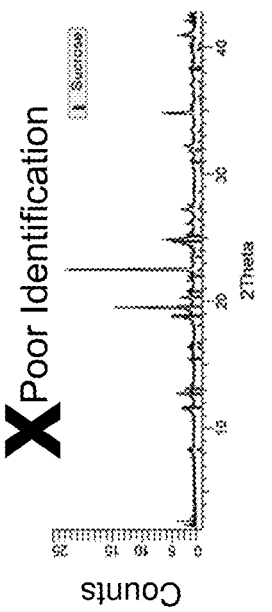
Figure 4A:
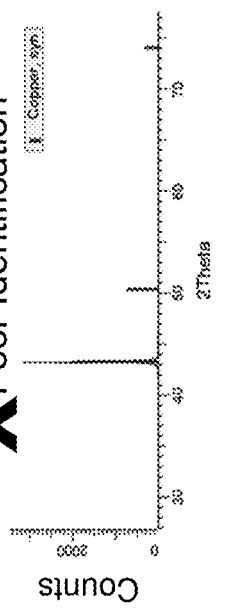
Figure 4A:
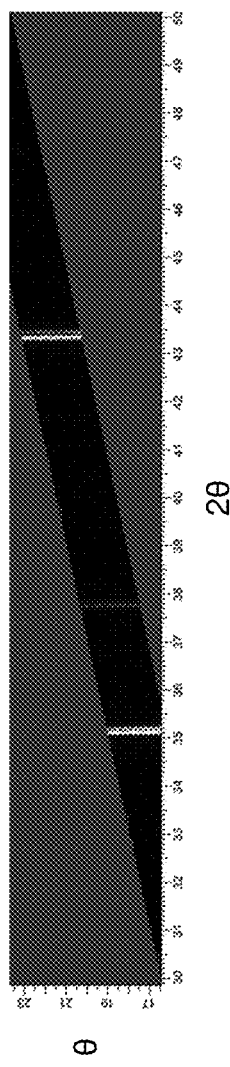
Figure 4B:
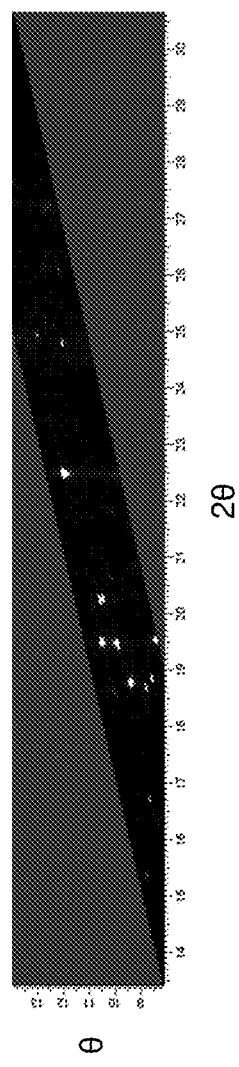
FIG. 4B shows a two-dimensional diffractogram and corresponding X-ray diffraction spectrum for a powder sample consisting of relatively large crystallites with random orientation.
Figure 4C:
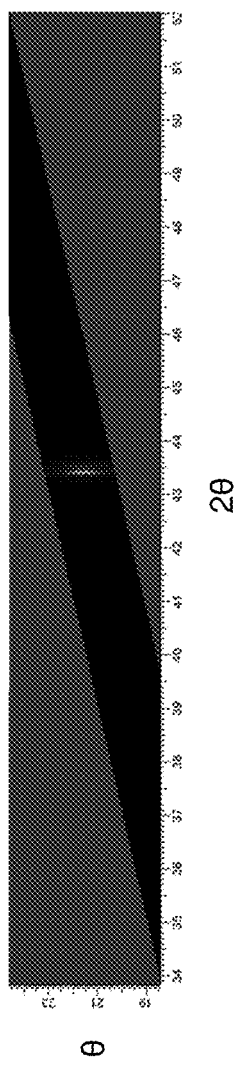
FIG. 4C shows a two-dimensional diffractogram and corresponding X-ray diffraction spectrum for a powder sample consisting of relatively small crystallites with a preferred orientation.

FIGS. 4A-4C show two-dimensional diffractograms generated from three different powder samples measured using a system like that of FIG. 3A. FIG. 4A corresponds to a sample made up of sufficiently small crystallites having a random orientation. This results in uniform, sharply defined diffraction rings at distinct $2\theta$ positions. As shown in the righthand portion of the figure, the result is a good set of identification peaks that may be used for characterization of the sample material. FIG. 4B corresponds to a sample made up of crystallites that have a random orientation, but that are too large to provide uniform diffraction rings. Instead, localized, high-intensity reflections from the large crystallites dominate the image. The result, as shown in the righthand portion of the figure, is a poor identification due to large variations in peak intensities compared to an accurately measured fingerprint pattern, including extreme accentuation and complete elimination of some peaks. FIG. 4C corresponds to a sample made up of sufficiently small crystallites that have a preferred (i.e., non-random) orientation. This results in diffraction rings with a smooth shape and broadly varying intensity and, as shown in the righthand portion of the figure, a poor identification due to missing peak information indicative of the crystalline structure of sample material.

Morphological data provided by the present invention may be used to indicate to a user when sample preparation is less than ideal. In one embodiment, an automated detection may be used to identify when a sample has crystallites that are too large or have a preferred orientation, as shown in FIGS. 4B and 4C, respectively. Such an automated system could be incorporated into a crystallography instrument and warn a user of substandard sample preparation during or following a measurement routine. This could allow a user, for example, to remove a sample for additional grinding or better packing to improve its measurability in a subsequent measurement.

The invention claimed is:

1. An X-ray diffractometer for the collection of X-ray diffraction data from a sample, comprising:
   an X-ray source that emits a divergent X-ray beam having a substantially fixed width in a first direction and a thickness in a second direction perpendicular to the first direction that increases proportionally to a distance from the source, the source being positioned relative to the sample such that the beam illuminates a two-dimensional area of a surface of the sample;
   an X-ray detector configured to detect an X-ray signal diffracted from the sample exclusively across a one-dimensional detection area; and
   a positioning mechanism for repositioning at least one of the source and detector along a circular path, with said one-dimensional detection area being parallel to a tangent of said circular path, so as to allow for collection of the diffracted X-ray signal by the detector at a plurality of relative angular positions of the source, detector and sample, said detected X-ray signal being used to form a multi-dimensional dataset indicative of X-ray intensities in said one-dimensional detection area for each of said relative angular positions.

2. A diffractometer according to claim 1 wherein the X-ray source comprises an aperture through which the beam passes.

3. A diffractometer according to claim 2 wherein the aperture blocks a portion of the beam in said second direction.

4. A diffractometer according to claim 1 wherein the detector comprises a one-dimensional detector array.

5. A diffractometer according to claim 1 wherein the positioning mechanism comprises a goniometer to which the X-ray source, the detector and the sample are mounted in a predetermined relative orientation.

6. A diffractometer according to claim 1 wherein the X-ray source and the detector each have a distance to the sample that is substantially equal.

7. A diffractometer according to claim 1 wherein the diffracted X-ray signal from the sample is narrowed to a substantially linear profile at the detector.

8. A diffractometer according to claim 1 wherein the sample is a powder sample.

9. A diffractometer according to claim 1 wherein the multi-dimensional dataset is indicative of morphological characteristics of the sample that may affect the quality of the X-ray diffraction data.

10. A method of collecting X-ray diffraction data from a sample, the method comprising:
    illuminating the sample with an X-ray source that emits a divergent X-ray beam having a substantially fixed width in a first direction and a thickness in a second direction perpendicular to the first direction that increases proportionally to a distance from the source, the source being positioned relative to the sample such that the beam illuminates a two-dimensional area of a surface of the sample;
    detecting, with an X-ray detector, an X-ray signal diffracted from the sample exclusively across a one-dimensional detection area; and
    repositioning, with a positioning mechanism, at least one of the source and detector along a circular path, with said one-dimensional detection area being parallel to a tangent of said circular path, so as to allow for collection of the diffracted X-ray signal by the detector at a plurality of relative angular positions of the source, detector and sample, said detected X-ray signal being used to form a multi-dimensional dataset indicative of X-ray intensities in said one-dimensional detection area for each of said relative angular positions.

11. A method according to claim 10 further comprising passing the X-ray beam through an aperture that blocks a portion of the beam in the second direction.

12. A method according to claim 10 wherein said X-ray detector comprises a one-dimensional detector array.

13. A method according to claim 10 wherein the positioning mechanism comprises a goniometer to which the X-ray source, the detector and the sample are mounted in a predetermined relative orientation.

14. A method according to claim 10 wherein the X-ray source and the detector each have a distance to the sample that is substantially equal.

15. A method according to claim 10 wherein the diffracted X-ray signal from the sample is narrowed to a substantially linear profile at the detector.

16. A method according to claim 10 wherein the sample is a powder sample.

17. A method according to claim 10 wherein the positioning mechanism repositions at least one of the source and detector along a circular path, and wherein said one-dimensional detection area is parallel to a tangent of said circular path.

18. A method according to claim 10 wherein the multi-dimensional dataset is indicative of morphological characteristics of the sample that may affect the quality of the X-ray diffraction data.

* * * * *